United States Patent [19]
Colon et al.

[11] Patent Number: 5,112,887
[45] Date of Patent: May 12, 1992

[54] FORMABLE COATINGS

[75] Inventors: Ismael Colon, Piscataway, N.J.; Charles N. Merriam, Harvey Cedars; Philip F. Wolf, Bridgewater, both of N.J.

[73] Assignee: Union Carbide Chemicals & Plastics Technology Corporation, Danbury, Conn.

[21] Appl. No.: 742,555

[22] Filed: Aug. 8, 1991

Related U.S. Application Data

[63] Continuation of Ser. No. 441,218, Nov. 28, 1989, abandoned, which is a continuation of Ser. No. 850,783, Apr. 11, 1986, abandoned, and a continuation-in-part of Ser. No. 785,385, Oct. 8, 1985, abandoned.

[51] Int. Cl.$^5$ ............................................. C08L 63/10
[52] U.S. Cl. .................................... 523/400; 523/459; 525/415; 525/438; 525/930; 428/418
[58] Field of Search ............... 523/400, 459; 525/415, 525/438, 930; 428/418

[56] References Cited

U.S. PATENT DOCUMENTS

| | | | |
|---|---|---|---|
| 3,329,740 | 7/1967 | Battersby | 525/930 |
| 3,925,504 | 12/1975 | Koleski et al. | 525/186 |
| 3,962,174 | 6/1976 | Berardinelli | 525/438 |
| 4,370,382 | 1/1983 | Salensky | 523/459 |

FOREIGN PATENT DOCUMENTS 1130528  10/1968  United Kingdom .

OTHER PUBLICATIONS

Journal of Applied Polymer Science, vol. 27, No. 3, Mar. 1982, pp. 839–855.
Macromolecules, vol. 14, No. 6, Nov.–Dec. 1981, pp. 1644–1650.

*Primary Examiner*—Paul R. Michl
*Assistant Examiner*—Edward J. Cain
*Attorney, Agent, or Firm*—Gerald L. Coon

[57] ABSTRACT

A coating composition capable of substantial deformation without loss of continuity, adhesion or protective properties. The coating composition comprises a phenoxy resin mixed with a relatively soft modifier resin having certain specific properties. In a preferred embodiment, a particulate material, such as a zinc pigment, may also be included. A crosslinker may also be included.

14 Claims, No Drawings

FORMABLE COATINGS this application is a continuation of prior U.S. application Ser. No. 07/441,218, filing date Nov. 28, 1989, now abandoned and which is a continuation of application Ser. No. 06/850,783, filing date Apr. 11, 1986, now abandoned and which is a continuation-in-part of application Ser. No. 06/785,385, filing date Oct. 8, 1985, now abandoned.

BACKGROUND OF THE INVENTION

1. Field of the Invention

This invention relates to formable coatings utilizing phenoxy resin binders.

2. Description of the Prior Art

Thermoplastic poly(hydroxyethers) are well known in the art and are commonly referred to as phenoxy resins. Likewise, blends of such resins with relatively softer resins are known (see U.S. Pat. Nos. 3,925,504 and 4,337,330); blends of these types have been found useful to improve the flexibility of phenoxy resins in processing such as injection molding, or conversely to improve the processability of the resin into which the phenoxy is blended.

Phenoxy resins are also well known as coil coating resins, and in particular as binder resins in zinc-rich, corrosion-resistant coatings (see U.S. Pat. No. 4,391,855, commonly assigned U.S. Pat. No. 4,476,260, and commonly assigned patent, application Ser. No. 662,896, filed Oct. 19, 1984, now U.S. Pat. No. 4,529,756). Such coatings, while they provide excellent corrosion resistance on nondeformed surfaces, are often not fully satisfactory for uses in which the substrate and coating undergo substantial deformation, or where bake temperatures of less than about 400° F. are used (so-called "low bake" systems). Typical of uses involving deformation are those involving the stamping and forming of sheet metal, as in the automobile manufacturing industry. As a result of such deformation, corrosion resistance is seriously degraded. While blending the phenoxy resin with softer resins has been reasonably successful for flexibilizing the phenoxy for, e.g., molding purposes, such blends have not proven to be satisfactory in the preparation of, e.g., solvent-borne, zinc-rich coating compositions. The problems encountered derive from a variety of factors: the need to maximize the concentration of the phenoxy resin in order to preserve its contribution to corrosion resistance, the need to achieve compatibility among the blended resins, the need for solubility in certain solvents preferred by the coatings industry, the need to achieve certain glass transition temperatures, and the like. Accordingly, it is desirable to flexibilize the phenoxy resin without significantly impairing either the corrosion resistance or the adhesion of the coating, while at the same time meeting the various processing needs indicated above. This unique balance of diverse properties has been realized by the instant invention.

In addition, with certain metal substrates it is necessary to use relatively low temperature bake cycles (peak metal temperature of less than about 400° F.) in order to prevent the degradation of the good mechanical properties of the metal. With conventional phenoxy resins, it is not practical to use such low temperature bake cycles, because the material does not adequately flow and wet out the substrate to provide good adhesion, which is crucial to the performance of the coating. Using the blends of the instant invention it is possible to provide good adhesion and coating performance even with such low temperature bake cycles.

Further, there are a variety of applications, where the coating must be resistant to solvents or to hot water or steam and still remain highly formable. An example of such an application is in draw-redraw can coatings, where the coatings must undergo extensive elongation. Such coatings are typically crosslinked in order to enhance their blush resistance under steam sterilization conditions, but this usually leads to coating failure under deep-draw conditions. It has been found that the instant coating compositions contribute greatly improved resistance to failure and blush to such crosslinked, draw-redraw coatings applications.

SUMMARY OF THE INVENTION

According to the instant invention there is provided a formable coating composition comprising:

(a) a phenoxy resin
(b) about 1 to about 50%, preferably about 5 to about 30%, by weight of the total resin of a modifier resin which is relatively soft in comparison to the phenoxy resin and is compatible with the phenoxy resin and has:
  (1) a reduced viscosity of about 0.1 to about 2, preferably about 0.2 to about 1, dL/g in tetrahydrofuran at 25° C.;
  (2) a glass transition temperature (Tg) of about $-120°$ to about 30°, preferably about $-100°$ to about 0° C.;
  (3) a solubility in Cellosolve acetate at 25° C. of at least about 1 g/100 g of solvent;
  (4) a molecular weight of about 2,000 to about 90,000, preferably about 6,000 to about 60,000;
(c) optionally, a particulate material;
(d) optionally, a crosslinker.

The instant invention also provides a coated article comprising a metallic substrate and adhering thereto as a coating the composition described above.

In a preferred embodiment of the invention, the particulate material is zinc pigment, thereby providing a zinc-rich, corrosion resistant coating.

DESCRIPTION OF THE INVENTION

The combination of the phenoxy resin with the modifier resin produces a coating composition which is formable. By that term is meant that the coating is able to withstand physical operations to the substrate (e.g., rolling, bending, stamping, cutting, etc.) without significant damage to the continuity and adhesion of the coating. Accordingly, the protective properties of the coating are preserved.

As mentioned above, phenoxy resins are substantially linear, thermoplastic resins well known and described in the art, for example, U.S. Pat. Nos. 4,476,260; 3,294,747; and 3,277,051, the relevant disclosures of which patents are incorporated herein by reference, especially columns 2-5 of U.S. Pat. No. 4,476,260. It will be appreciated that included within the scope of the term "phenoxy" are those aromatic epoxy-derived resins of high molecular weight which have very few residual epoxide functional groups, e.g., those sold by Shell Chemical Co. under the trade designations EPONOL Resin Nos. 52, 53, 55, and the like.

It will also be appreciated that phenoxy resins, since they contain pendant hydroxyl groups, are crosslinkable by materials, e.g., melamines, isocyanates, phenolics, urea-formaldehydes, etc., which are reactive with hydroxyl groups.

The modifier resins useful in this invention are generally amorphous thermoplastic resins, but it is possible to use crystalline resins, provided the mixture of the modifier resin with the phenoxy is generally amorphous. The modifier resins are relatively soft in comparison with the phenoxy resin. By the term "relatively soft" is meant that the modifier resin has a tensile modulus of less than about 70,000 psi at room temperature.

In addition, the useful modifier resins must be compatible with the phenoxy resin. By the term "compatible" is meant that a homogeneous mixture is obtained at room temperature having a single phase and a single Tg.

Moreover, useful modifier resins must meet the specific criteria identified above as to reduced viscosity, molecular weight, glass transition temperature, and solubility in Cellosolve acetate.

Suitable general classes of polymers that are compatible with phenoxy are: polyesters, polyester urethanes, polyether urethanes, and polyalkylene ethers (such as Polyox, polyethylene glycols, and UCON ® fluids). The preferred materials are aliphatic polyesters, such as those derived from epsilon-caprolactone. These include a variety of lactone-based polyols and polymers, for example TONE TM polyols and polymers available from Union Carbide Corp., as described in U.S. Pat. No. 3,169,945. These materials are produced by the catalytic polymerization of an excess of a lactone, e.g., caprolactone, and an organic polyfunctional initiator having at least two reactive hydrogen atoms. Illustrative of the latter are diols, such as ethylene glycol, triethylene glycol, 1,2-propylene glycol, and the like.

When the organic functional initiator is reacted with the lactone, a reaction occurs that can be represented in its simplest form by the equation

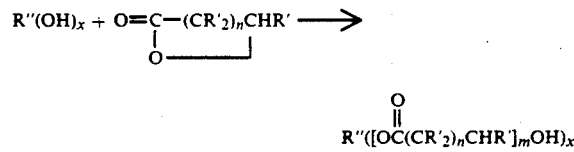

wherein n=3-6, preferably 4.

In this equation, the organic functional initiator is the R"(OH)$_x$ and the caprolactone is

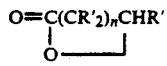

This can be caprolactone itself or a substituted caprolactone wherein R' is an alkyl, alkoxy, aryl, cycloalkyl, alkaryl or aralkyl group, and R" is an alkyl or alkoxy group, all as shown in U.S. Pat. No. 3,169,945.

In formulating coatings within the scope of this invention, various important considerations should be kept in mind. Since phenoxy resins themselves confer properties on the coating which are desirable for corrosion resistance (e.g., barrier properties) and for physical handling (e.g., anti-blocking), the concentration of the phenoxy resin should be maintained as high as possible, consistent with the need to be able to deform the coating during manufacture and to meet the bake cycle required. Similarly, it is desirable to maintain the Tg of the phenoxy/modifier resin blend as high as possible, consistent with the need to be able to deform, in order to prevent blocking of the coated metal when stored with adjacent surfaces in contact with each other, e.g., in roll or stacked sheet form. Ideally, a blend Tg of 30° C. or greater is desired. Since the coating compositions of this invention are applied as solutions in organic solvents, the resins and concentrations should be selected for ease of application using standard equipment in the industry. Commonly used solvents include ketones (such as MEK, diethyl ketone, and cyclohexanone) and esters (such as CELLOSOLVE ® acetate)-(Union Carbide), Dibasic Esters (Du Pont)—mixtures of methyl esters of diacids, ethyl-3-ethoxypropionate, and the like). In addition, a variety of solvent blends of the above-mentioned solvents with aromatic solvents (such as toluene, xylene and naphtha) can be used.

When used, such co-solvents should be non-solvents for the phenoxy and should be limited to about 50% by weight or less, based on the total solvent. For ease of application, the fully formulated coating composition should have a viscosity of no more than about 600 seconds, as measured with a No. 4 Ford cup at 25° C.

When a particulate material is included in the coating composition, its concentration is not narrowly critical, but usually should be less than about 95% by weight of the total coating, preferably about 65% to about 90%. In the preferred, zinc-rich embodiment of the invention, commercially available zinc pigments having a particle size of about 2 to about 15 microns may conveniently be used. It is preferred to use zinc pigment having an average particle size of about 6 to about 7 microns.

It will be understood as well that the coating compositions of this invention may contain functional additives known to the art, e.g., crosslinking agents, suspending agents, viscosity modifiers, colorants, antioxidants, and the like.

Where used, crosslinking agents should be provided in sufficient concentration to maximize blush and solvent resistance while retaining flexibility for improved draw and adhesion performance. Such formulation is within the skill of the art, but typically the crosslinker will be about 2-10%, preferably about 4-8%, based on total resin solids.

In the examples below, the following procedure was used to make up the coating compositions. All components were charged to a 1-quart container and heated with mild stirring for about 30 minutes at 60°-70° C. The container was removed from the heat and the contents were thoroughly mixed, using a Dispersator (available from Premier Mill Corp.) equipped with a 2⅛" Cowles head, for 5-10 minutes at about 1500 RPM. The container was then reheated for about 10 minutes to restore the contents to 60°-70° C. The composition was then further mixed in a Dispersator equipped with a 2½" media disc having four ⅜-inch diameter holes it. The mixer was started at about 1060 RPM, and about 80% by volume (based on total formulation) of metal oxide (e.g., aluminum or zirconium oxide) beads (2-mm diameter) was added. Mixing speed was increased to about 3,000 RPM and held there for 15-30 minutes while controlling the temperature at 60°-70° C. Mixing was then stopped, and the composition was allowed to settle while cooling to room temperature, and the beads were removed by filtration.

Key properties of compositions so prepared were measured using the following procedures:

Fineness of grind: Determined using Hegman gauge;

Viscosity: No. 4 Ford cup at 25° C.;

Specific Gravity: Using a 25 mL specific gravity bottle;

Non-volatiles: 1-2 g of paint are placed in an aluminum dish, weighed, dried in a circulating air oven at 130° C. for one hour, and reweighed.

Coating compositions for test purposes were formulated according to the following recipe:

| Phenoxy resin (control) or phenoxy/modifier resin blend | 45 parts |
|---|---|
| Solvent | 287 |
| Zinc pigment | 300 |
| MPA 60X | 11 |
| Aerosil R-972 | 2.7 |
| CaO | 1.5 |

In the above formulation, MPA 60X is an anti-settling agent available from NL Chemicals, Hightstown, N.J. Aerosil R-972 is a thickener available from Degussa Corp., Teterboro, N.J. Calcium oxide serves as a scavenger for water.

In the examples below, the following materials were used:

| UCON 25H | ethylene oxide/propylene oxide copolymer having a viscosity of about 2,000 cP. |
|---|---|
| UCON 75H | similar copolymer of about 90,000 cP viscosity. Both materials are available commercially from Union Carbide Corp. |
| TONE 0260 | a caprolactone polyol of about 3000 molecular weight which melts at 50-60° C. and has a viscosity of about 1,500 centistokes at 130° F. |
| TONE PCL-700 | a caprolactone polymer of about 60,000 molecular weight. Both materials are commercially available from Union Carbide Corp. |
| Estane 5715 | a polyester urethane which is commercially available from BF Goodrich. |
| PKHH Phenoxy | a phenoxy resin of about 60,000 molecular weight, commercially available from Union Carbide Corp. |
| EPONOL 55-L-32 | a high molecular weight epoxy resin having a Gardner-Holdt viscosity of $Z_4$-$Z_8$ and available from Shell Chemical Co. |
| Dow XP-71709 | a high molecular weight epoxy resin available from Dow Chemical Co., Europe. |
| CYMEL 370 | a melamine resin available from American Cyanamid. |

In the examples below, the formability evaluation procedure identified as the "Double-Draw" test is carried out as follows:

Circular samples (66 mm diameter) are cut from test panels 200-300 mils thick and are clamped (clamp pressure=900 psi) in a Tinius Olsen ductility tester (Ductomatic A-12). A first draw is performed using a cup which is 35 mm OD×26 mm high, with a 0.040" die clearance. A second draw is then performed using a cup which is 28 mm OD×36 mm high, with the same die clearance as before. In both draws, the draw rate is 12 inches per minute. The double-draw cups thus formed are degreased in hexane, dried, given visual ratings, and tape tested. The visual rating scale is as follows:

| RATING | DEFINITION |
|---|---|
| 1 | No skirt - smooth coat. |
| 2 | Skirt - smooth coat. |
| 3 | Generally smooth coat (90%) with slight breaks. |
| 4 | Moderate breaks in coat at least 1 large area. |
| 5 | Moderate breaks in coat with some scale in rest of the coat (30-50%). |
| 6 | Generally scaled (70%) appearance with at least one area of substrate exposed. |
| 7 | Poor coat, scaled appearance (90%), loose flakes and many areas of substrate exposed. |
| 8 | Nearly all of substrate exposed. |

For the tape test, the skirt is carefully removed from the second-draw cup and the cup is weighed on an analytical balance. The cup is taped around its circumference and the tape is then quickly removed. The cup is re-weighed, and the difference is reported as the weight loss. Alternatively, the tape may be weighed, then re-weighed after removal, the difference being reported as weight loss. The tape used is the No. 670 adhesion test tape described in ASTM D-3359, available from Paul N. Gardner Co., Florida.

The adhesion evaluation procedure identified in the examples as the "Olsen Button" test utilizes ball indentations prepared according to ASTM E643-78 using the Tinius Olsen Ductomatic A-12. This is a single-draw test. The tape test is performed on each button. Tape (as previously described) is placed over the button and pressed on the button using a pencil eraser. The tape is then removed within 60 seconds and rated relative to a pictorial chart standard used by General Motors and available from General Motors upon request. In this rating system, 0 represents total coverage of the tape with zinc-rich paint, while 10 represents essentially clean tape, i.e., essentially no removal of paint by the tape; thus, the higher the number the better the adhesion.

In the evaluation procedure identified in the examples as the "blush" test (Table V), a 3"×4" panel of tin-free steel is coated with a 25% solids solution of resin to yield a dry coating weight of 8 mg/in.$^2$. The panels are air-dried a minimum of ½ hour and baked at 400° F. for 10 minutes. A 1" strip is cut from each test panel and placed in a 100 mL beaker containing water. Approximately 75% of the length of the strip is immersed in water. The panel and beaker are placed in an autoclave and heated at 121° C. for 90 minutes. The test strips are then removed, patted dry using a Kimwipe, and then visually rated for blush. The exposed portion is rated separately from the immersed portion. The visual rating scale is as follows:

| Rating | Performance | or | Effect |
|---|---|---|---|
| 10 | Perfect | | None |
| 9 | Excellent | | Trace |
| 8 | Very good | | Very slight |
| 6 | Good | | Slight |
| 4 | Fair | | Moderate |
| 2 | Poor | | Considerable |
| 1 | Very poor | | Severe |
| 0 | No value | | Complete failure |

EXAMPLES

The following examples illustrate various embodiments of the invention, but in no way limit it.

EXAMPLE 1

Using the coating compositions shown in the Tables below and the recipe described above, coatings were prepared and applied to steel test panels 200-300 mils thick using a No. 12 wire-wound rod. The panels had been commercially pre-coated with a zinc/chromium primer composition known in the trade as "Dacromet" (a trademark of Metal Coatings, International, Chardon, Ohio). The test panels were baked in a 360° C. oven for 90 seconds, then immediately quenched in a room temperature water bath. Alternatively, the panels were baked in a 260° C. oven for 2 minutes prior to quenching. The resulting dry film thickness of coating of this invention was about 0.4 mil. The results of the various test described above are shown in the following tables.

TABLE I

| | Double-Draw Test (Rating of 1 is best) | | |
|---|---|---|---|
| Sample No. | Binder Resin | Visual Rating | Weight Loss (mg) |
| 1 | PKHH (Phenoxy-control) | 6 (a) 6 (b) | 31.7 (a) 33.5 (b) |
| 2 | 80/20 PKHH/UCON 25H | 2.5 (a) 3 (b) | 17.8 (a) 17.4 (b) |
| 3 | 80/20 PKHH/UCON 75H | 2.5 (a) 3 (b) | 17.5 (a) 15.3 (b) |
| 4 | 75/25 PKHH/TONE 0260 | 2 (a) 2 (b) | 13.6 (a) 13.7 (b) |
| 5 | 70/30 PKHH/TONE 0260 | 2 (a) 2 (b) | 11.8 (a) 13.2 (b) |
| 6 | 75/25 PKHH/PCL-700 | 2 (a) 3 (b) | 15.6 (a) 16.3 (b) |
| 7 | 50/50 PKHH/Estane 5715 | 5 (b) | 19.2 (b) |
| 8 | Dow XP-71707 (Control) | 7 (b) | 75.0 (b) |
| 9 | 70/30 Dow XP-71707/ TONE 0260 | 2-3 (b) | 12.5 (b) |
| 10 | EPONOL-55-L-32 (Control) | 7 (b) | 119.6 (b) |
| 11 | 70/30 EPONOL-55-L-32/ TONE 0260 | 2-3 (b) | 27.7 (b) |

(a) 360° bake for 90 seconds
(b) 260° bake for 2 minutes

Table I illustrates that blends of this invention produce coatings having much better appearance and adhesion after double-draw then the plain phenoxy or high molecular weight epoxy resins of the prior art, and that those improvements were retained even when a lower temperature bake cycle was used.

TABLE II

| | Ball Indent (Olsen Button) Adhesion Test (Rating of 10 is best) | | |
|---|---|---|---|
| | | TAPE RATING | |
| Sample No. | Binder Resin | 260° | 360° |
| 1 | PKHH (Phenoxy-control) | 7 | 6 |
| 2 | 80/20 PKHH/UCON 25H | 6 | 2 |
| 3 | 80/20 PKHH/UCON 25H | 7 | 3 |
| 4 | 75/25 PKHH/TONE 0260 | 8 | 7 |
| 5 | 70/30 PKHH/TONE 0260 | 8 | 8 |
| 6 | 75/25 PKHH/PCL-700 | 8 | 7 |
| 7 | 50/50 PKHH/Estane 5715 | 8 | 7 |
| 8 | Dow XP-71707 (control) | 7 | — |
| 9 | 70/30 Dow XP-71707/ TONE 0260 | 8 | — |
| 10 | EPONOL-55-L-32 (control) | 3 | — |
| 11 | 70/30 EPONOL-55-L-32/ TONE 0260 | 7 | — |

Table II indicates that blends of this invention are comparable to or better than PKHH at 260° in this particular test, but that the two blends with UCON fluids do not perform as well as PKHH at 360°. The other three phenoxy blends, however, out-perform PKHH even at 360°.

EXAMPLE 2

In order to evaluate resistance to corrosive environment, coated samples were subjected to salt spray testing according to ASTM B117-73 with 400 hours exposure time. In Table III, "Button Corrosion" visually measures corrosion at the deformed area (i.e., the button "dome"), while "Field Corrosion" measures corrosion in the flat (undrawn) area of the sample.

TABLE III

| | Salt Spray Corrosion Performance | | |
|---|---|---|---|
| Sample No. | Binder Resin | Button Corrosion (a) | Field Corrosion (b) |
| 1 | PKHH (Phenoxy-control) | 8 | 9 |
| 2 | 80/20 PKHH/UCON 25H | 6 | 10 |
| 3 | 80/20 PKHH/UCON 75H | 6 | 9 |
| 4 | 75/25 PKHH/TONE 0260 | 7 | 7 |
| 5 | 70/30 PKHH/TONE 0260 | 8 | 8 |
| 6 | 75/25 PKHH/PCL-700 | 5 | 8 |
| 7 | 50/50 PKHH/Estane 5715 | 8 | 7 |

(a) Ratings are 1-8 with 1 being best.
(b) Ratings are 1-10 with 10 being best.

The corrosion performance of the Olsen buttons on the panels indicates that the blends provide better corrosion protection in drawn areas due to their greater flexibility. Surprisingly, they are very close in corrosion resistance to PKHH in areas that have not been drawn (field corrosion), which is attributed to the good barrier properties of PKHH.

EXAMPLE 3

Physical properties of the coating compositions exemplified in the preceding examples are shown in Table IV.

TABLE IV

| | Physical Properties of Coating Compositions | | | |
|---|---|---|---|---|
| Sample No. | Binder Resin | Tg (a) | Viscosity (b) | Spec. Gravity (c) | % Solids |
| 1 | PKHH (Phenoxy-control) | 100 | 185 | 1.96 | 66.3 |
| 2 | 80/20 PKHH/ UCON 25H | 45 | 86 | 1.94 | 66.2 |
| 3 | 80/20 PKHH/ UCON 75H | 46 | 100 | 1.93 | 65.8 |
| 4 | 75/25 PKHH/ TONE 0260 | 43 | 83 | 1.95 | 65.3 |
| 5 | 70/30 PKHH/ TONE 0260 | 35 | 68 | 1.94 | 65.6 |
| 6 | 75/25 PKHH/ PCL-700 | 46 | 600 | 2.00 | 67.3 |
| 7 | 50/50 PKHH/ | 68 | 382 | 1.99 | 66.9 |

TABLE IV-continued
Physical Properties of Coating Compositions

| Sample No. | Binder Resin | Tg (a) | Viscosity (b) | Spec. Gravity (c) | % Solids |
|---|---|---|---|---|---|
| | Estane 5715 | | | | |

(a) °C.
(b) Seconds, Ford #4 cup at 25° C.
(c) g/cc

EXAMPLE 4

Formulation for crosslinking were prepared using the following recipe:
- 204 parts Cellosolve acetate
- 21 parts Aromatic 150 (an aromatic solvent blend available from Exxon)
- 75 parts Resin or Resin Blend To the above 25% solids solution is added CYMEL 370 on the basis of parts CYMEL 370 per hundred parts resin (PHR). Compositions were formulated and tested with the results shown in Table V. For these tests, steel panels (as previously described) were coated using a #28 wire-wound rod. The wet panels were baked in a 400° C. oven for 10 minutes. The dried coatings weighed approximately 8 mg/in.$^2$.

TABLE V
Crosslinked Coatings

| Resin | Ratio | Cymel 370 PHR | Double-Draw Visual | Blush |
|---|---|---|---|---|
| PKHH | 100% | 4 | 3 | Moderate |
| PKHH | 100% | 8 | 7-8 | Slight |
| PKHH/TONE 0260 | 70/30 | 4 | 1 | None |
| PKHH/TONE 0260 | 70/30 | 8 | 2-3 | None |
| Dow XP-71707 | 100% | 8 | 7 | |
| Dow XP-71707/ TONE 0260 | 70/30 | 8 | 1 | |
| EPONOL 55-L-32 | 100% | 8 | 7 | |
| EPONOL 55-L-32/ TONE 0260 | 70/30 | 8 | 1 | |

Table V demonstrates that blends of this invention provide crosslinked coatings which have excellent formability and blush resistance. Phenoxy-type resins when crosslinked sufficiently to reduce blush are not able to undergo double-draw without failure. The blends, however, provide excellent formability and even better blush resistance than a phenoxy-type product crosslinked at comparable levels.

We claim:
1. A formable coating composition comprising:
   (a) a phenoxy resin;
   (b) about 1 to about 50 percent by weight of the total resin of a modifier resin which is relatively soft in comparison to the phenoxy resin and has:
   (1) a reduced viscosity of about 0.1 to about 2 dL/g in tetrahydrofuran at 20° C.;
   (2) a Tg of about −120° to about 30° C.;
   (3) a solubility in Cellosolve acetate at 25° C. of at least about 1 g .per 100 g. of solvent; and
   (4) a molecular weight of about 2,000 to about 90,000;
   (c) a crosslinker; and
   (d) optionally, a particulate material.
2. A coating composition of claim 1 wherein the concentration of the modifier resin is about 5 to about 30% by weight.
3. A coating composition of claim 1 wherein the modifier resin has:
   (1) a reduced viscosity of about 0.2 to about 1 dL/g in tetrahydrofuran at 25° C.; and
   (2) a Tg of about −100 to about 0° C.
4. A coating composition of claim 1 wherein the modifier resin is a polyalkylene oxide.
5. A coating composition of claim 5 wherein the polyalkylene oxide is UCON 25H or UCON 75H.
6. A coating composition of claim 1 wherein the modifier resin is a polyester.
7. A coating composition of claim 6 wherein the modifier resin is an aliphatic polyester.
8. A coating composition of claim 7 wherein the aliphatic polyester is derived from epsilon-caprolactone.
9. A coating composition of claim 1 wherein the modifier resin is a polyester urethane.
10. A coating composition of claim 1 wherein the modifier resin is a polyether urethane.
11. A coating composition of any one of claims 1 or 3 wherein the particulate material is zinc pigment.
12. A corrosion-resistant article comprising a metallic substrate and adhering thereto a coating composition of any one of claim 1 or 3.
13. A coating composition of claim 1 .containing a crosslinker which is a melamine resin.
14. An article comprising a drawn-redrawn metallic substrate and adhering thereto a coating composition of claim 1.

* * * * *